(12) United States Patent
McGlinchey et al.

(10) Patent No.: US 7,565,607 B2
(45) Date of Patent: *Jul. 21, 2009

(54) AUTOMATIC IMAGE CAPTURE FOR GENERATING CONTENT

(75) Inventors: Andrew J. McGlinchey, Seattle, WA (US); Aravind Bala, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 442 days.

This patent is subject to a terminal disclaimer.

(21) Appl. No.: 10/887,414

(22) Filed: Jul. 8, 2004

(65) Prior Publication Data

US 2004/0250214 A1   Dec. 9, 2004

Related U.S. Application Data

(63) Continuation-in-part of application No. 10/337,745, filed on Jan. 7, 2003.

(51) Int. Cl.
*G06F 3/00* (2006.01)
(52) U.S. Cl. .................... 715/709; 715/763; 715/967
(58) Field of Classification Search ......... 715/734–737, 715/738–740, 748–749, 862, 745, 747, 780, 715/708, 712, 731, 771–772, 805, 806, 807, 715/763, 709, 967; 713/2; 709/224; 717/124
See application file for complete search history.

(56) References Cited

U.S. PATENT DOCUMENTS

| | | | | |
|---|---|---|---|---|
| 5,361,361 A | 11/1994 | Hickman et al. | ............ | 715/705 |
| 5,436,637 A | 7/1995 | Gayraud et al. | ............ | 715/705 |
| 5,481,667 A | 1/1996 | Bieniek et al. | ............ | 715/709 |
| 5,535,422 A | 7/1996 | Chiang et al. | ............ | 395/155 |
| 5,550,967 A | 8/1996 | Brewer et al. | ............ | 715/709 |
| 5,596,752 A | 1/1997 | Knudsen et al. | ............ | 717/117 |
| 5,671,351 A | 9/1997 | Wild et al. | ............ | 714/38 |
| 5,781,720 A | 7/1998 | Parker et al. | ............ | 714/38 |
| 5,825,356 A | 10/1998 | Habib et al. | ............ | 345/338 |
| 5,890,178 A * | 3/1999 | Haneda | ............ | 715/203 |

(Continued)

FOREIGN PATENT DOCUMENTS

EP   1 437 648   7/2004

(Continued)

OTHER PUBLICATIONS

C.F. Drew, "A Natural Language Interface for Expert System Help Desk", IEEE Conference on Managing Expert System Programs and Projects, pp. 209-215, Sep. 10-12, 1990.

(Continued)

*Primary Examiner*—Steven P Sax
(74) *Attorney, Agent, or Firm*—Westman, Champlin & Kelly, P.A.

(57) ABSTRACT

The present invention is directed to a system for automatically capturing images based on the actions of an author in completing steps in an overall task performed on a user interface. To capture the images the author activates a recording component. The recording component records images corresponding to the author's actions on the user interface. The recording component can pass the recorded images to an editing component where an author can generate text corresponding to the images to describe the actions. The images can also be published embedded in the text, if desired.

25 Claims, 6 Drawing Sheets

U.S. PATENT DOCUMENTS

| | | | |
|---|---|---|---|
| 5,926,638 | A | 7/1999 | Inoue |
| 6,061,643 | A | 5/2000 | Walker et al. .............. 702/123 |
| 6,182,277 | B1 | 1/2001 | DeGroot et al. ............ 717/115 |
| 6,219,047 | B1 | 4/2001 | Bell .......................... 345/336 |
| 6,226,785 | B1 | 5/2001 | Peterson et al. ............ 717/106 |
| 6,239,800 | B1 | 5/2001 | Mayhew et al. ............. 715/764 |
| 6,243,707 | B1 | 6/2001 | Humpleman et al. ........ 707/102 |
| 6,246,404 | B1 | 6/2001 | Feigner et al. .............. 345/708 |
| 6,259,445 | B1 | 7/2001 | Hennum et al. ............. 345/338 |
| 6,307,544 | B1 | 10/2001 | Harding ..................... 715/709 |
| 6,308,146 | B1 | 10/2001 | La Cascia et al. ............ 703/22 |
| 6,434,629 | B1 | 8/2002 | Stearns et al. |
| 6,504,554 | B1 | 1/2003 | Stone et al. ................. 715/760 |
| 6,532,023 | B1 | 3/2003 | Schumacher et al. ........ 345/704 |
| 6,658,646 | B1 | 12/2003 | Hernandez, III ........... 717/115 |
| 6,662,225 | B1* | 12/2003 | Motoyama et al. .......... 709/224 |
| 6,862,682 | B2* | 3/2005 | Louden et al. ................. 713/2 |
| 6,948,152 | B2 | 9/2005 | Dubovsky ................... 717/124 |
| 6,966,013 | B2 | 11/2005 | Blum et al. .................... 714/38 |
| 7,024,658 | B1 | 4/2006 | Cohen et al. ................ 717/117 |
| 7,036,079 | B2* | 4/2006 | McGlinchey et al. ....... 715/704 |
| 7,047,498 | B2 | 5/2006 | Lui et al. .................... 715/762 |
| 7,055,136 | B2 | 5/2006 | Dzoba et al. ................ 717/125 |
| 7,055,137 | B2 | 5/2006 | Mathews .................... 717/125 |
| 7,185,286 | B2 | 2/2007 | Zondervan et al. .......... 715/762 |
| 7,305,659 | B2 | 12/2007 | Muller et al. ............... 717/127 |
| 7,426,734 | B2* | 9/2008 | Debique et al. ............. 719/310 |
| 2002/0154153 | A1 | 10/2002 | Messinger et al. .......... 345/705 |
| 2003/0020751 | A1* | 1/2003 | Safa et al. ................... 345/760 |
| 2003/0208712 | A1* | 11/2003 | Louden et al. .............. 714/742 |
| 2003/0222898 | A1 | 12/2003 | Macomber et al. .......... 345/709 |
| 2004/0010513 | A1* | 1/2004 | Scherr et al. ............. 707/104.1 |
| 2004/0130572 | A1 | 7/2004 | Bala ........................... 345/762 |
| 2004/0215587 | A1* | 10/2004 | Bertrand et al. ............... 706/59 |
| 2004/0261026 | A1 | 12/2004 | Corson ....................... 715/704 |
| 2005/0033713 | A1 | 2/2005 | Bala et al. |
| 2005/0050135 | A1* | 3/2005 | Hallermeier ................ 709/200 |
| 2006/0010420 | A1 | 1/2006 | Peterson et al. ............. 717/106 |
| 2006/0059433 | A1 | 3/2006 | McGlinchey et al. |
| 2006/0206866 | A1* | 9/2006 | Eldrige et al. ............... 717/122 |

FOREIGN PATENT DOCUMENTS

| | | |
|---|---|---|
| WO | WO 97/35253 | 9/1997 |
| WO | PCT/US2004/022450 | 7/2004 |

OTHER PUBLICATIONS

J. Marx et al., "WING: An Intelligent Multimodal Interface for a Materials Information System", 14$^{th}$ Information Retrieval Colloquium, pp. 67-78, Apr. 13-14, 1992.

S. Di Segni, "Goethe: A Natural Language Help System in Prolog an Experiment with the Lexicon Driven Approach", Thirteenth International Conference Artificial Intelligence Expert Systems Natural Language, Avignon, France, vol. 3, pp. 223-232, May 24-28, 1993.

European Search Report from Application No. EP 05 10 7922.

"Spreadsheet Formula Highlighting Tool," IBM Technical Disclosure Bulletin, IBM Corp., New York, US, Nov. 1, 1989, pp. 130-131.

Chinese Application No. 200410001642.X Third Office Action, Apr. 25, 2008.

Russian Official Action Application No. 2004100523, Apr. 1, 2008.

European Exam Report Application No. 03 028 648.8-1243, Oct. 26, 2006.

First Office Action from Chinese patent application 200480043312.5, dated Sep. 28, 2007.

Search Report from European patent application 05107922.6, dated Dec. 6, 2005.

Examination Report from European patent application 03028648.8, dated Nov. 2, 1997.

Communication Report for European patent application No. 05 107 922.6, dated Oct. 19, 2007.

Japanese patent application No. 2004-002455, First Official Notice of Rejection, dated Nov. 7, 2008 (translation).

Reference 1: Japanese Patent Application Laid-open No. Hei 8-509-2308 (1996).

"Microsoft's HTML Help," Microsoft Interactive Developer, No. 3, pp. 37-43, Sep. 18, 1997.

Examiner's First Report on Australian patent application No. 2003270997, dated Feb. 23, 2009.

* cited by examiner

3. Click Network Connections.

Click Network Connections

Note: If Network and Internet Connections is not visible, click Switch to Category View.

Switch to Category View

4. Highlight a connection that you want to help protect, and then click Change settings of this connection.

Change connection settings

AUTOMATIC IMAGE CAPTURE FOR GENERATING CONTENT

RELATED APPLICATIONS

The present invention is a continuation-in-part of co-pending related U.S. patent application Ser. No. 10/337,745, filed Jan. 7, 2003, entitled ACTIVE CONTENT WIZARD: EXECUTION OF TASKS AND STRUCTURED CONTENT; Reference is made to U.S. patent application Ser. No. 10/887,058, filed Jul. 8, 2004, entitled AUTOMATIC TEXT GENERATION; and U.S. patent application Ser. No. 10/887,543, filed Jul. 8, 2004, entitled IMPORTATION OF AUTOMATICALLY GENERATED CONTENT, and assigned to the same assignee as the present invention.

BACKGROUND OF THE INVENTION

The present invention deals with generating content, such as help content. More specifically, the present invention deals with automatic capturing of images indicative of actions of a user on a user interface.

The Graphical User Interface (GUI) is a widely used interface mechanism. GUI's are very good for positioning tasks (e.g. resizing a rectangle), visual modifier tasks (e.g. making something an indescribable shade of blue) or selection tasks (e.g. this is the one of a hundred pictures I want rotated). The GUI is also good for speedy access to quick single step features. An application's GUI is a useful toolbox that is organized from a functional perspective (e.g. organized into menus, toolbars, etc) rather than a task oriented perspective (e.g. organized by higher level tasks that users want to do, such as "make my computer secure against hackers").

However, GUIs present many problems to the user as well. Using the toolbox analogy, a user has difficulty finding the tools in the box or figuring out how to use the tools to complete a task composed of multiple steps. An interface described by single words, tiny buttons and tabs forced into an opaque hierarchy does not lend itself to the way people think about their tasks. The GUI requires the user to decompose the tasks in order to determine what elements are necessary to accomplish the task. This requirement leads to complexity. Aside from complexity, it takes time to assemble GUI elements (i.e. menu clicks, dialog clicks, etc). This can be inefficient and time consuming even for expert users.

One existing mechanism for addressing GUI problems is a written help procedure. Help procedures often take the form of Help documents, PSS (Product support services) KB (Knowledge base) articles, and newsgroup posts, which fill the gap between customer needs and GUI problems. They are analogous to the manual that comes with the toolbox, and have many benefits. These benefits include, by way of example:

1) Technically speaking, they are relatively easy to author even for non-technical authors;
2) They are easy to update on a server so connected users have easy access to new content; and
3) They teach the GUI thereby putting users in control of solving problems.

However, Help documents, PSS KB articles and newsgroups have their own set of problems. These problems include, by way of example:

1) Complex tasks require a great deal of processing on the user's part. The user needs to do the mapping from what is said in each step to the GUI. This can lead to errors in that steps are skipped, described incorrectly or inadequately or are described out of order.
2) Troubleshooters, and even procedural help documents, often include state information that creates complex branches within the help topic, making topics long and hard to read and process by the end user. Toolbars may be missing, and may need to be turned on before the next step can be taken. Troubleshooters often ask questions about a state that is at best frustrating (because the troubleshooter should be able to find the answer itself) and at worst unanswerable by non-experts.
3) There are millions of documents, and searching for answers involves both a problem of where to start the search, and then how to pick the best search result from the thousands returned.
4) There is no shared authoring structure. Newsgroup posts, KB articles, troubleshooters and procedural Help documents all have different structures and authoring strategies, yet they are all solving similar problems.
5) For a user, it is simply difficult to read step-by-step text, and then visually search the UI for the element being described and take the action described with respect to that element.

Another existing mechanism for addressing GUI problems is a Wizard. Wizards were created to address the weaknesses of GUI and written help procedures. There are now thousands of wizards, and these wizards can be found in almost every software product that is manufactured. This is because wizards solve a real need currently not addressed by existing text based help and assistance. They allow users to access functionality in a task-oriented way and can assemble the GUI or tools automatically. Wizards allow a program manager and developer a means for addressing customer tasks. They are like the expert in the box stepping the user through the necessary steps for task success. Some wizards help customers setup a system (e.g. Setup Wizards), some wizards include content with features and help customers create content (e.g. Newsletter Wizards or PowerPoint's AutoContent Wizard), and some wizards help customers diagnose and solve problems (e.g. Troubleshooters).

Wizards provide many benefits to the user. Some of the benefits of wizards are that:

1) Wizards can embody the notion of a "task." It is usually clear to the user what the wizard is helping them accomplish. With step-by-step pages, it can be easy for a user to make choices, and in the case of well designed wizards the incidence of the user becoming visually overwhelmed is often reduced.
2) Wizards can automatically assemble and interact with the underlying features of the software and include the information or expertise needed for customers to make choices. This saves the user time in executing the task.
3) Wizards can automatically generate content and can save users time by creating text and planning layout.
4) Wizards are also a good means for asking questions, getting responses and branching to the most relevant next question or feature.

However, wizards too, have their own set problems. Some of these problems include, there are many more tasks that people try to accomplish than there are wizards for accomplishing them. Wizards and IUI (Inductive User Interfaces) do not teach customers how to use underlying GUI and often when the Wizard is completed, users are unsure of where to go next. The cost of authoring of wizards is still high and requires personnel with technical expertise (e.g. software developers) to author the Wizard.

Thus, authoring all of these types of content that describe procedures to be taken by a user, is often error prone. It is quite easy to miss steps, to describe steps incorrectly, or to lose track of what step is currently being described in a long sequence of UI manipulations. However, this written procedural help content is extremely common. Such help content often ships with products, on-line help content is provided for product support teams, and procedures inside companies are often documented in this way for specific business processes. Thus, this type of information is difficult to author and often contains errors.

In addition, end users must typically follow the steps that have been authored. It can be difficult to read step-by-step text, and then search the UI for the particular control element being described and then to take the proper action with respect to that control element. It has been found that many users find this such a burden that they simply scan the first one or two steps of the text, and then try their best to determine which UI elements need to be actuated next, barely referring back to the written text steps. It has also been found that the eye can find and recognize pictures much more easily than it can read a word, mentally convert the word into a picture, and then find the corresponding UI control element. Yet, in the past, this is exactly what was done, as an author must painstakingly take screenshots of each step, crop the images, and paste them into a document in the right place, in order to have any type of visual depiction of an action to be taken.

SUMMARY OF THE INVENTION

One embodiment of the present invention addresses some of the problems of Wizards, Help, Knowledge base articles and troubleshooters by providing a content component that allows for an easy way to author thousands of tasks (or wizards), and either integrate with the GUI and teach the user how to use the GUI to execute the task or to execute the task on behalf of the user. In one specific embodiment, the present invention deals with authoring active content wizard (ACW) scripts, and with the text and images that are part of an ACW script.

The present invention is directed to a system for automatically capturing images based on the actions of an author in completing steps in an overall task performed on a user interface. To capture the images the author activates a recording component. The recording component records images corresponding to the author's actions on the user interface. The recording component can pass the recorded images to an editing component where an author can generate text corresponding to the images to describe the actions. The images can also be published embedded in the text, if desired.

In one embodiment, a text generator automatically generates text corresponding to the images. This text can then be used to form a text document, which provides instructions or other information to a user. During or after the process of generating the text document, the text can be edited using an editor to enhance the comprehensibility of the document.

DETAILED DESCRIPTION OF ILLUSTRATIVE EMBODIMENTS

The present invention deals with automatically recording images based on a user action on a user interface. Prior to describing the present invention in greater detail, one exemplary environment in which the invention can be used will be discussed.

Figure 1:
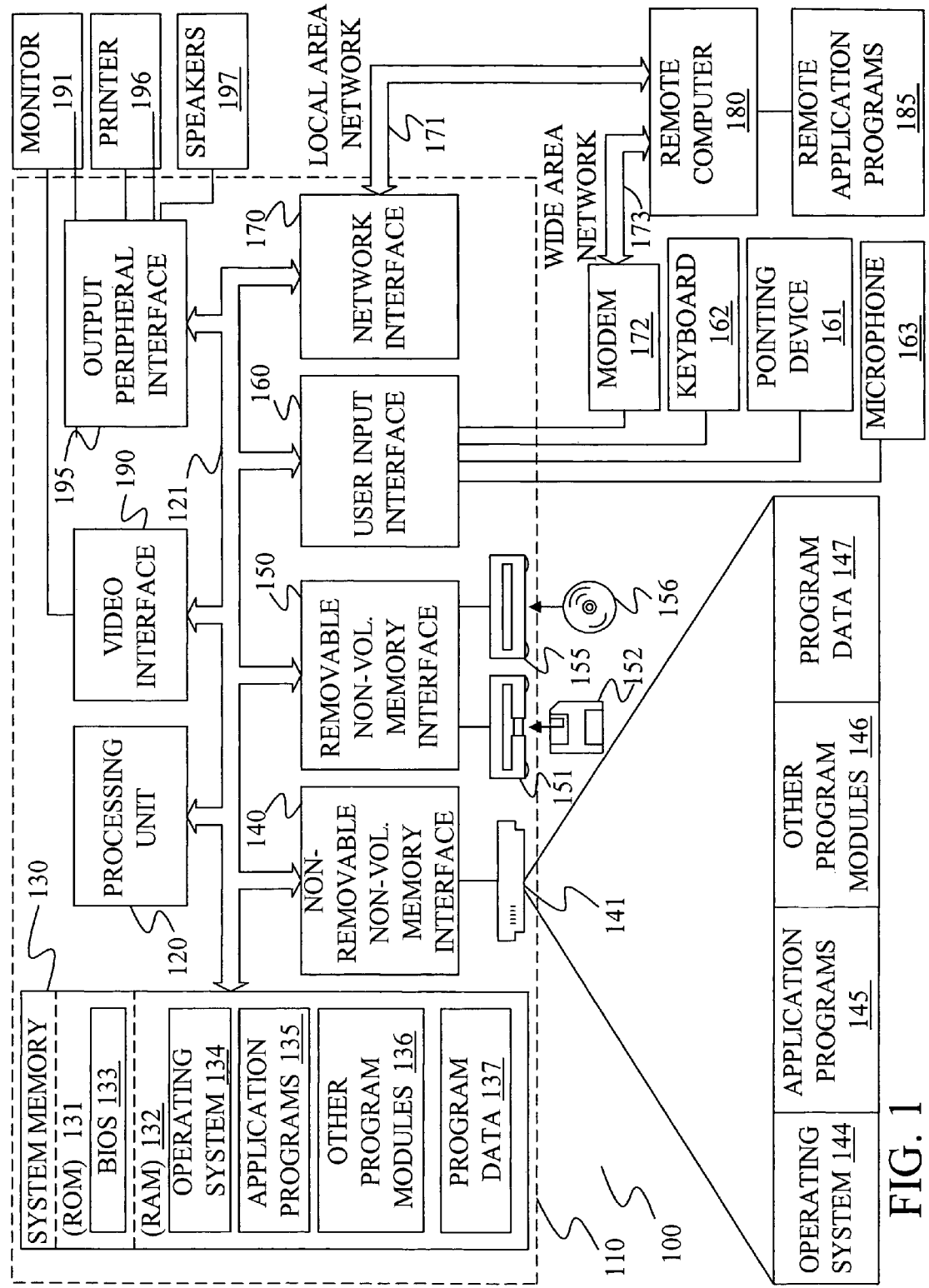
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
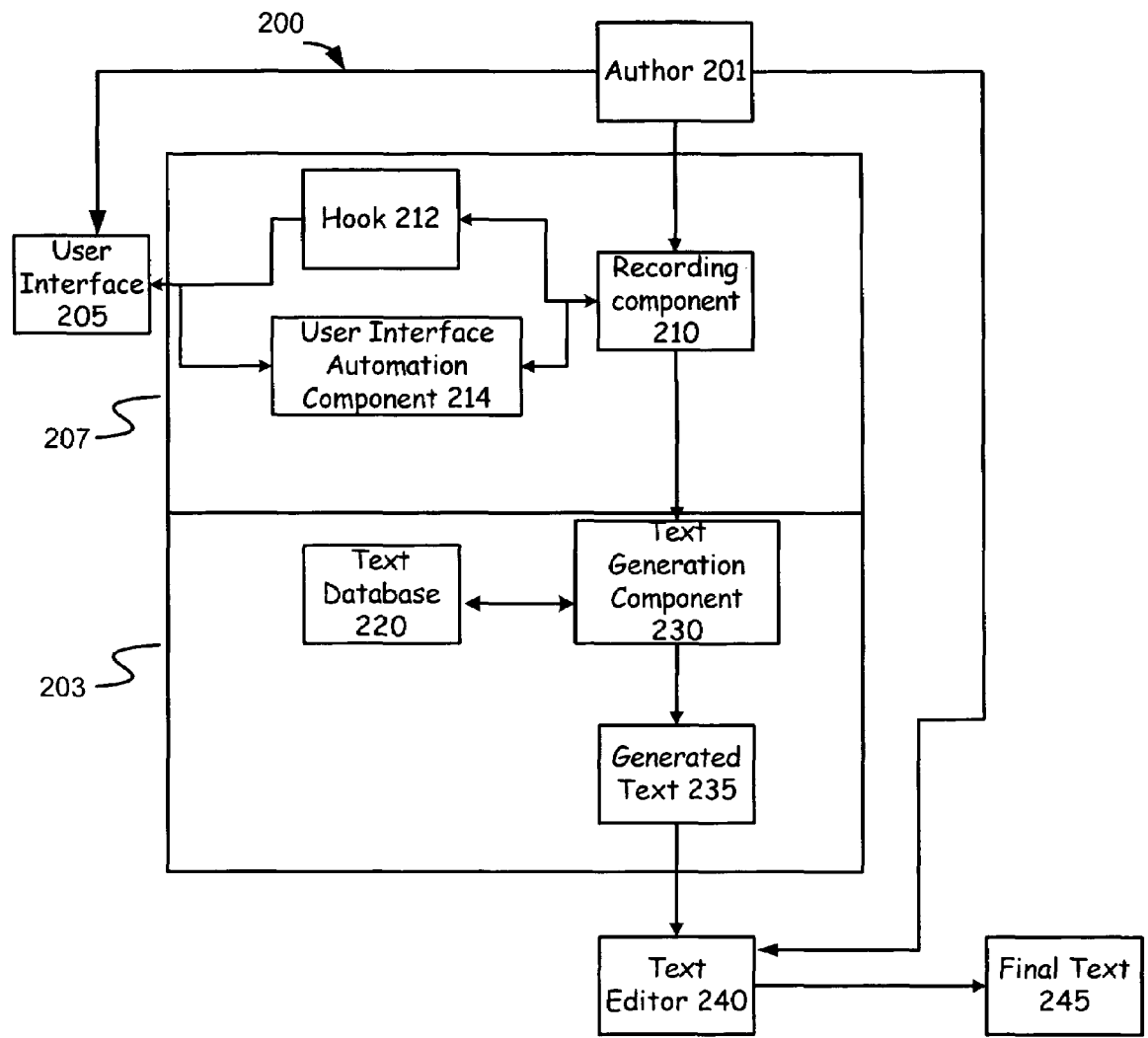
FIG. 2 is a block diagram illustrating the components of an automatic image capturing and text generation system of the present invention.

FIG. 2 is a block diagram illustrating the components of an image capturing system 200 according to one embodiment of the present invention. FIG. 2 also shows system 200 with recorder 207 and optional automatic text generator 203. The recorder 207 includes a recording component 210, a hook component 212, and a user interface (UI) automation component 214. The optional text generator 203 includes a text database (or data store) 220, and text generation component 230. The image capturing system 200 interacts with a user interface 205. An author can configure the components of system 200 to automatically record images corresponding to actions performed on the controls of user interface 205, and optional text generator 203 automatically generates text 235 that describes those actions. Author 201 can also edit the automatically generated text 235 or generate text from scratch on editor 240 to obtain final text 245 describing the task (or UI control actions). Final text 245 can also illustratively include the images embedded therein. A number of the components in FIG. 2 will now be described in greater detail.

User Interface 205 is, in one embodiment, a conventional graphical user interface with controls that allow a user to take actions to perform a task. The user interface 205 is illustratively displayed on display device 191 shown in FIG. 1. This type of graphical user interface (GUI) is a widely used interface mechanism.

Recording component 210 is in one embodiment an application program that allows the author 201, or another user, to perform a task on the user interface 205, and records the tasks by capturing images of each step in the task. As is described in more detail below, while the author 201 is performing the steps associated with the task on the user interface 205, the recording component 210 records information about what controls and windows the author interacts with on the user interface 205. This information is optionally provided to the text generator 230 to automatically generate the text in a document, such as a help document.

The recording component 210 interacts with the user interface 205 through the hook 212 and the user interface (UI) automation component 214. These components can be separate from the recording component 210, or in some embodiments these components can be integral with the recording component 210.

The hook component 212 is, in one embodiment, a module or component within an operating system that is used by the computer. When a hook is set for mouse clicks, for example, information indicative of the mouse click (such as a message) is forwarded to the hook component 212 where it is consumed, and after its associated images have been recorded by the recording component 210, it is played back for other components in the computer that have registered to receive mouse clicks. Therefore, generally, the hook component 212 acts as a buffer between the operating system and the target application. The hook component 212 can be configured to look for substantially any input action, such as the type of signal received, e.g. single click, double click, right or left click, keyboard action, touch-sensitive screen input, etc. Once the information representing the action and screen shot image indicative of the action is recorded by the recording component 210, the information representing the mouse click (or whatever action recorded) is then played back by the hook component 212 to the application. One reason for this is that the user may take a second action before the first action is recorded. The second action may well cause the state of the user interface to change, and thus result in improper recording of the first action. For example, if the action being recorded is clicking a menu item, the click will make the menu item disappear. Therefore, the image is captured before the mouse click is passed to the application. By consuming the first mouse message and playing it back once recording is complete, this ensures that the first action will be recorded properly.

It should also be noted that the functions performed by the hook component 212 (i.e., listening for mouse clicks and playing them back) are illustratively performed on separate threads. This ensures that all user interface actions (e.g., mouse clicks, keyboard actions etc.) will be properly recorded and played back without missing any. Further, the record and playback mechanism of hook component 212 can override any timeout features that are implicit within the operating system. This can be necessary if the timeout period of the operating system is too short to allow for proper recording of the action and capturing of the image indicative of the action. For instance, capturing an image may take 300-400 ms or so, and even up to a second if the entire desktop is being captured. Thus, overriding the timeout and operating on multiple threads are helpful.

User interface automation component 214 is illustratively a computer program configured to interpret the atomic steps for the overall task performed by the author or user through the user interface 205. In one embodiment, user interface automation component 214 is a GUI automation module implemented using Microsoft User Interface Automation by Microsoft Corporation of Redmond, Wash. This module provides a programmatic way to access information about the visible user interface, and to programmatically interact with the visible user interface. However, depending on the system setup, the user interface automation component 214 can be implemented using any application that is able to programmatically navigate a graphical user interface and to detect (and optionally programmatically navigate the GUI to perform and execute) commands on the user interface.

User interface automation component 214 thus detects each of the steps associated with the desired task performed on the user interface 205 by author 201 (or another user) in task order. For instance, as is described in greater detail below, when the task requires the user to click a button on the GUI to display a new menu or window, user interface automation component 214 determines which control is located at the position of the mouse cursor on user interface 205 and its size and its parent window. The recording component 210 uses information from hook component 212 (e.g., the type, name and state of the control) to record the name and properties of the control that was used to perform the step. This information is provided from the user interface automation component 214 and hook component 212 to the recording component 210 such that the recording component 210 can record the image of the button or the control that was used by the author to perform the step. Obtaining the image is described in greater detail below with respect to FIG. 3.

Text generation component 230 is a program or module configured to generate natural language text that describes the actions executed or performed during the recording process. The text generation component 230 uses the recorded images and other information recorded by the recording component 210 to search database 220 and to choose a correct template or entry from the text database 220 that corresponds to the recorded step.

Text database 220 is illustratively a database or other information storage system that is searchable by the text generator 230. Text database 220 contains information related to the controls that are available on the user interface 205. This information can include, for example, the name of the control, the type of control, the action performed on the control, and a textual description of the action as a natural language sentence.

In some embodiments the textual description for the entry is provided in multiple languages. When the textual description is provided in multiple languages, a language identifier is provided with each entry that allows the correct language to be selected.

However, depending on the needs of the system, other information can be provided in the text database 220. In one embodiment, some entries in the text database 220 have information related to two or more actions exemplified by multiple controls that are performed in sequence. Where multiple actions on multiple controls are represented by a single entry in the text database 220 the text for the entry contains natural language descriptions of the action performed on both controls as a single sentence. By combining the description of the two commands as a single sentence, the readability of the final text document is improved.

In one embodiment, the text database 220 is written in Extensible Markup Language (XML). The data for each entry can be stored as a series of subentries, where each subentry of the entry refers to an individual piece of information that is needed to identify the task. However, other formats can be used for storing the data.

In one embodiment, the text generation component 230 looks at two or more of the recorded actions when searching for entries in the text database 220. This can be done in order to provide a more fluid text document. For instance, good procedural documentation often combines more than one step into a single sentence as an enhancement to readability. If the text generation component 230 identifies two or more that match the recorded information in the text database 220, the text generation component 230 can use any known method to determine which entry in the database to choose, such as by disambiguating the entries based on scoring each entry, and selecting the entry that has the highest score.

According to one embodiment, based on the type of the control actuated on the user interface, and the performed action, the text generation component 230 searches the text database 220 for an entry that matches the executed control type and action. Once a match is identified in the text database 220, the text generation component 230 obtains the associated natural language description of the action from the text database 220, and places it as a sentence instruction in the generated text document 235. In an alternative embodiment, the text generation component 220 can also generate an executable version of the text document based on the information provided by the UI automation module 214.

When choosing a textual description from the text database 235, the text generation component can also look to the state of the control. This is important when the control is a checkbox or an expandable or collapsible tree. In this case merely clicking on the box may not be appropriate to describe the action, as the action on the control is the same regardless of the desired result. Therefore, in these cases, the new state of the control will influence the selected text. For example, if the control is a check box and it is to be deselected, the text matched would be based on the new state of the control plus the control's name.

Text editor 240 is an editor configured to correct, change, or add information or text to the automatically generated text 235. Depending on the resultant text generated by text generator 230, and the actions performed by the author, it may be necessary to edit the text to further enhance its understandability. Therefore, text editor 240 receives the generated text 235, and allows the author 201 to edit the generated text.

Text editing may be required, for example, because of a grammatical necessity or because one of the recorded steps required a user action, and the system did not request the description of the user action at the time it was recorded. In such a case (when a user input is required), while performing the task to be recorded according to one embodiment, the text generator 235 only provides a space in the text for the author to provide an instruction/description of what the user should do at this step.

For example, assume that the task being performed by the user and recorded by the recording component is to change the background paneling on the computers screen. This requires the user to choose a pattern for the background. Therefore, the text that is returned by the text database for a recorded user action to change the background can be "Please select [insert description of action]", where the author will have to edit the text to read "Please select the desired background from the list." Also during the editing stage the author 201 can provide a description of the overall task if this was not provided prior to recording the task. Once the text has been edited the final text 245 is output from the authoring tool 200 and is stored in an appropriate storage mode that allows for the final text to be retrieved by a user when desired.

Figure 3:
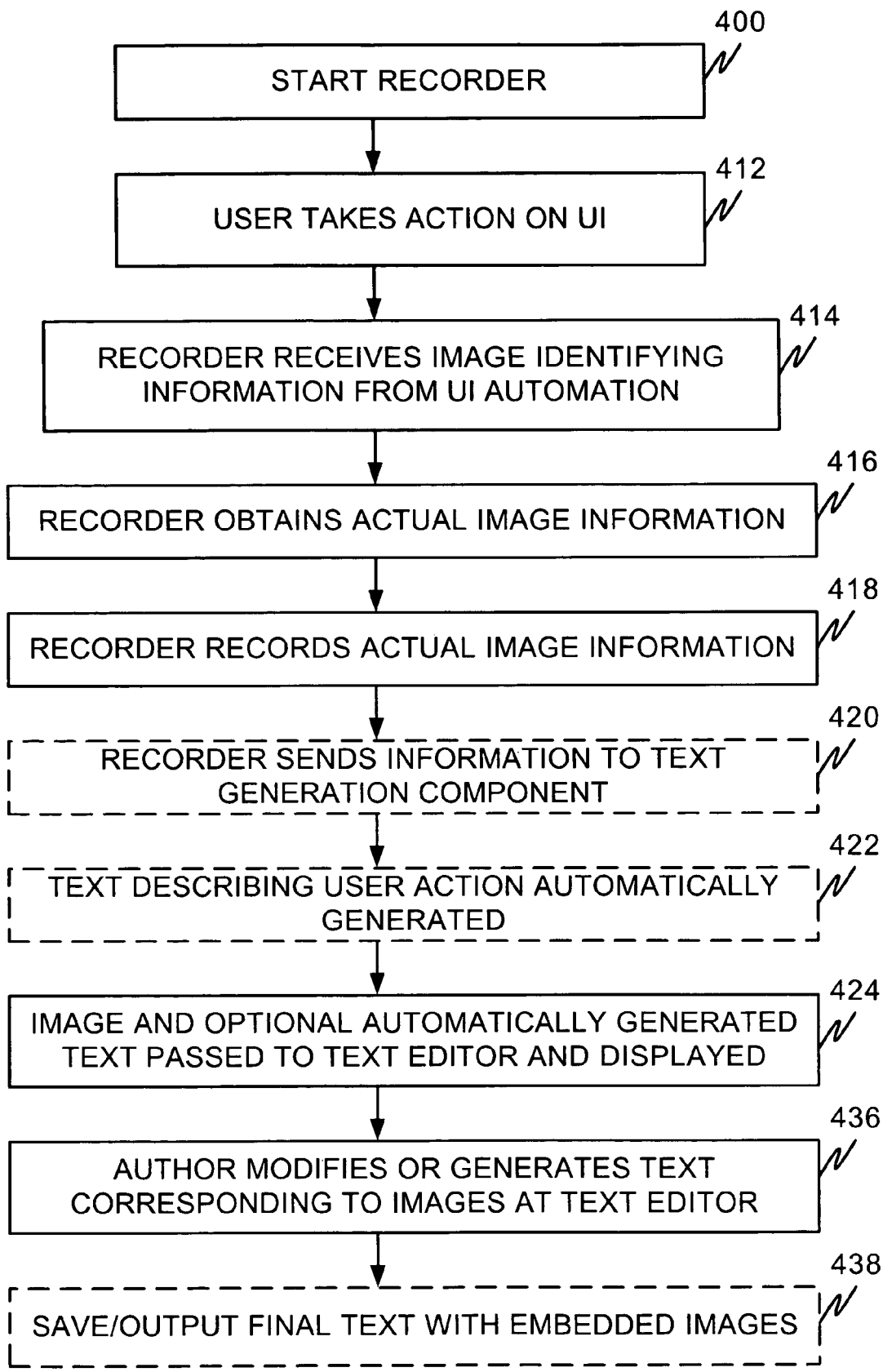
FIG. 3 is a flow diagram illustrating the operation of the system shown in FIG. 2 in capturing images related to user actions.
Figure 4:
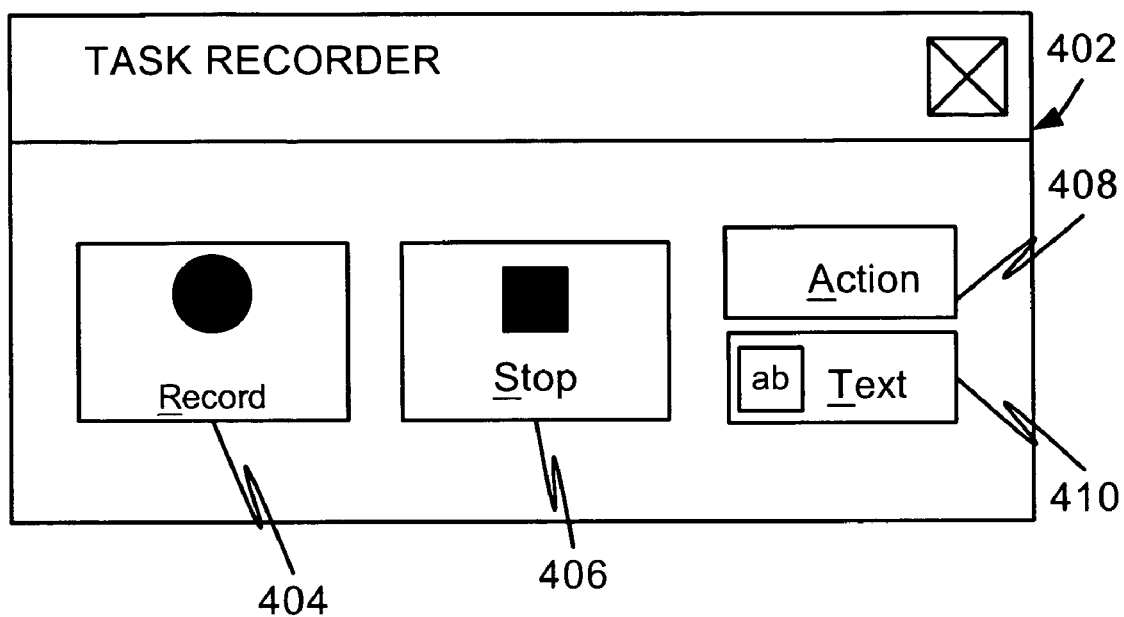
FIG. 4 is a screen shot depicting a control for recording component 210.

FIG. 3 is a flow diagram illustrating how system 200 operates in greater detail, in accordance with one embodiment of the invention. First, author 201 starts recording component 210. This is indicated by block 400 in FIG. 3. In order to do this, author 201 simply actuates a control, such as control 402 shown in FIG. 4. Record button 410 can be actuated by author 201 in order to begin recording. Stop button 406 is actuated to stop recording. As will be described below, author 201, can insert a description of user actions during text editing in text editor 240. In order to do this, the user actuates button 408. Similarly, as described below, author 201 can edit automatically generated text. This can be done by actuating text button 410 in FIG. 4. Additionally, in some embodiments, an additional button can be provided to allow the user to set a value. This is to allow correct text to be generated in instances when, for instance, at runtime, the user may be required to type a text into an edit box. Of course, other or different controls can be used as well.

Referring again to FIG. 3, once author 201 has started recording component 210, the system simply waits for a user to take an action on user interface 205. It will be noted that FIG. 2 shows that the user is author 201, but the user could be a different user as well.

Once the user has taken an action on user interface 205 (such as by manipulating a control element on the user interface) hook component 212 receives a message or other signal indicative of the user action. As discussed above, with respect to hook component 212, hook component 212 consumes the message and places it on a queue for recording. The user taking an action on UI 205 is indicated by block 412 in FIG. 3.

Recording component 210 then receives image identifying information from UI automation component 214. This is indicated by block 414 in FIG. 3. In one illustrative embodiment, UI automation component 214 provides recording component 210 with a number of items of information that allow recording component 210 to record images on the display screen which represent, or correspond to, the action taken by the user at user interface 205. In one illustrative embodiment, these items of information are the position of the control element on the display screen that the user has actuated or otherwise manipulated, the bounding rectangle or size of that control element, and the parent window that contains the control element.

Recording component 210 then obtains actual image information indicative of the screen shots associated with the user interface 205 and corresponding to, or reflecting, the action taken by the user. This is indicated by block 416 in FIG. 3.

In order to perform this step, recording component 210 can do a number of things in order to enhance the operation of the system. For instance, recording component 210 may determine that it would be helpful to record actual image information (or the actual screen shot) of more than just the control element manipulated by the user. This may be true, for example, if there is more than one similar control element currently on the display being manipulated by the user. Assume, for instance, that the user has clicked an "OK button" on the user interface. However, there may be more than one "OK button" on the display screen at that time. Therefore, in order to disambiguate among the various "OK buttons", recording component 210 may obtain the actual screen shot information for not only the particular "OK button" manipulated by the user, but for a desired number of pixels around that "OK button". This provides an image with greater context than simply an image of the control itself.

Similarly, recording component 210 may also record the screen shot image of the entire parent window that contains the control element. Of course, this contains a great deal of extra context which can be used to specifically identify the control element that the user has manipulated.

In order to determine whether additional context needs to be recorded by recording component 210, recording component 210 can make this determination using any of a wide variety of different techniques. For instance, recording component 210 can deploy heuristics that will identify an amount of context for recording. The heuristics may be based on the size and shape of the control element manipulated, the particular function of the control element manipulated, the type of control element (e.g., checkbox, textbox, treeview) the position of the control element on the screen (for instance, if the control element is in the upper left hand corner recording component 210 may take more pixels on the lower and right hand sides of the control element), or the heuristic can simply reflect a fixed number of pixels which are to be taken around the control element, regardless of where it is located and what functions are performed by the control element.

Recording component 210 can obtain the actual screen shot image information using any known technique. For example, in most operating systems, there are published application programming interfaces (APIs) that allow an application or other computing component to obtain a bitmap screen shot of any section of the screen as currently being displayed. Therefore, in one illustrative embodiment, recording component 210 simply makes an API call to obtain the information, once it knows the coordinates of the screenshot image information it desires, and the amount of context information and optionally the parent window of the control element.

Having obtained the actual image information, recording component 210 records it for later use. Depending on how it will be used, recording component 210 may compress or resize the image using standard image manipulation APIs. This reduces the memory required and the size of the final document. This is indicated by block 418 in FIG. 3. Of course, it will also be noted at this point that recording component 210 can record other information provided by UI automation component 214. For instance, UI automation component 214 illustratively provides recording component 210 with the control name, the control type, the action performed on the control, the type of manipulation performed (such as mouse click, mouse wheel rotation, keyboard keystrokes, touch pad input, etc.). This information can all be recorded by recording component 210.

In accordance with one embodiment of the present invention, optional text generation component 230, in conjunction with optional text database 220, automatically generates text associated with the images captured, and associated with the action taken by the user on user interface 205. In the embodiment in which these items are used, recording component 210 sends the information captured (such as click type, control type, control name, etc.) to text generation component 230. This is indicated by optional block 420 in FIG. 3. The automatically generated text illustratively provides a written procedure which corresponds to step by step instructions for each user manipulation of user interface 205 in order to perform an overall task that requires multiple manipulations of user interface 205.

In order to generate this text, text generation component 230 can use any suitable method. In one illustrative method, text generation component 230 searches text data store 220 for entries that correspond to the information received from recording component 210. For instance, text data store 220 may illustratively be an XML database containing a plurality of entries that include the type of control or other item manipulated by the user on user interface 205, the type of action, and a text corresponding to that action. Of course, other data storage methods can be used to implement data store 220, and data store 220 can contain additional or different information as well.

For example, assume that the information received from the recording component 210 indicates that the user has clicked on (or otherwise invoked) an "OK button". Then, text generation component 230 searches text data store 220 for an entry that matches this type of action. Once a match is found, text generation component 230 retrieves the text from that entry in text data store 220 that describes that type of action. The text may, for instance, simply say "click OK".

In any case, text generation component 230 illustratively and optionally automatically generates text describing the user action taken on user interface 205 and recorded by recording component 210. This is indicated by block 422 in FIG. 3.

The generated text is indicated by block 235 in FIG. 2. In one illustrative embodiment, the images recorded by recording component 210 are automatically embedded in the generated text 235, or are at least associated with the generated text 235 such that they can be recalled and displayed in conjunction with one another later in the process.

Next, the image data recorded by recording component 210 and the optional automatically generated text is provided to editor component 240. The images recorded by recording component 210 and automatically generated text are illustratively displayed on a display screen at editor 240 such that author 201 can generate text corresponding to those images. Displaying of the images and optionally the text generated by generation component 230 is indicated by block 424 in FIG. 3.

Figure 5:
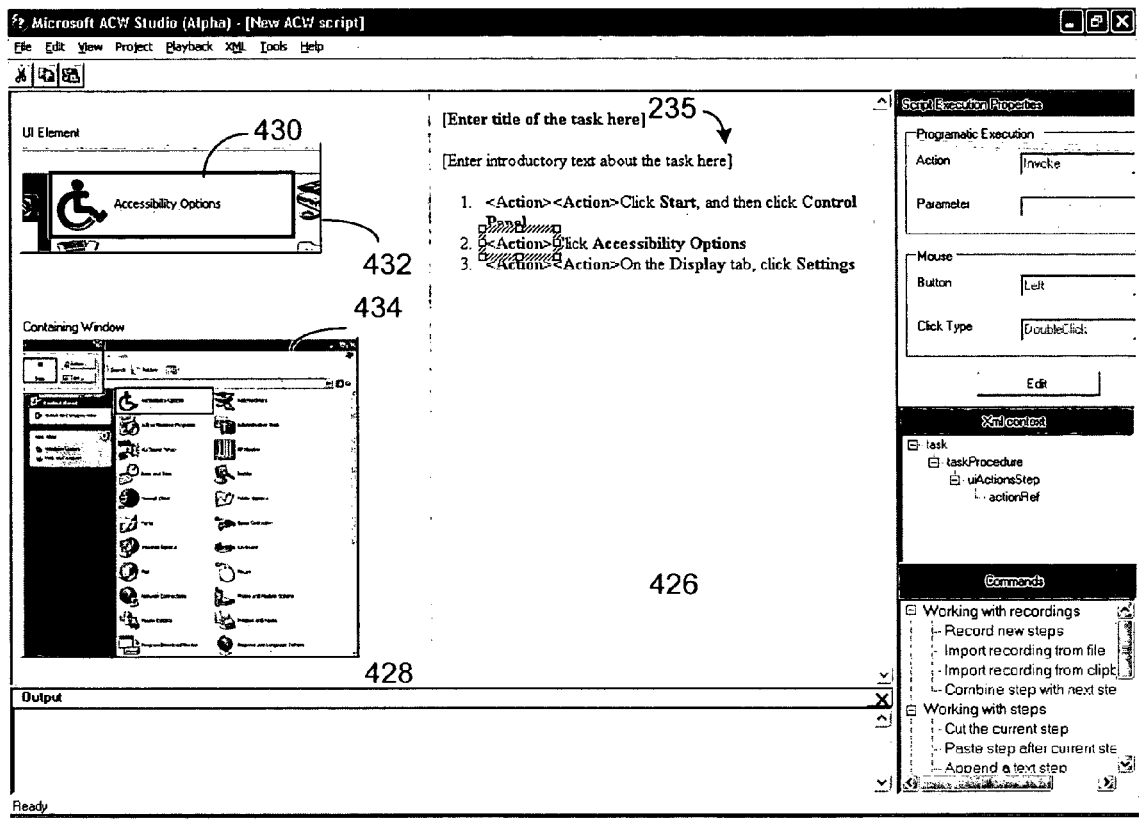
FIG. 5 is a screen shot better illustrating one embodiment in which images can be used to author content.

FIG. 5 is a screen shot illustrating one way in which the captured images and optional automatically generated text can be displayed to author 201 at editor 240. FIG. 5 includes two primary portions that relate to the present invention. The first portion comprises text display portion 426 and the second portion comprises image display portion 428. Text display portion 426 displays the optional automatically generated text 235, or text which is authored by author 201. Image display portion 428 displays the captured screen shot images recorded by recording component 210.

In the embodiment in which text is automatically generated, that text is shown at 235 in display portion 426, and it can be edited by the author using editor component 240 (one screenshot of which is shown in FIG. 5). Thus, the author can highlight each of the actions or other items displayed on display portion 426. The images associated with the highlighted item are displayed in window portion 428. Therefore, in the embodiment shown in FIG. 5, the author has highlighted action number two which corresponds to actuating the Accessibility Options control and the corresponding images are displayed in display portion 428. The user can then enter text or modify text, as desired, in order to obtain a full description of the step performed by the user at user interface 205. Modifying or generating text corresponding to the images using text editor 240 is indicated by block 436 in FIG. 4.

In the embodiment shown in FIG. 5, the user has actuated the Accessibility Option control 430 on user interface 205. It can be seen that recording component 210 has obtained not only the control box 430 corresponding to the Accessibility Options control, but a larger context box 432 containing a number of pixels surrounding the Accessibility Options button 430. Context box 432 displays additional context around Accessibility Options control 430 such that it can be more easily located on the screen.

FIG. 5 also shows that recording component 210 has obtained the parent window 434 that contains Accessibilities Options control 430. Therefore, the author can see exactly which control was manipulated by the user on user interface 205, and where that control resides on its parent window. This greatly assists the author in generating or modifying text describing the actions taken on the user interface.

Figure 6:
FIG. 6 illustrates one embodiment of a final text with embedded images in accordance with one embodiment of the present invention.
Figure 6:
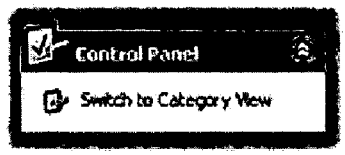
Figure 6:
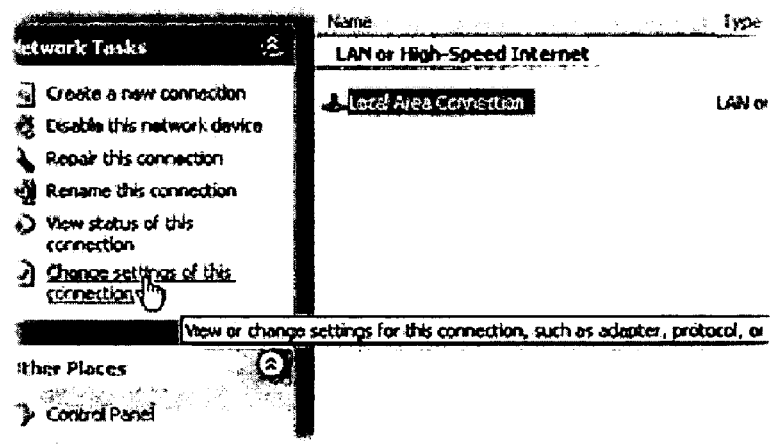

It will be appreciated that the present invention can be used in a wide variety of different ways. For instance, the present invention can be used to generate content (such as help content) in which the captured images are embedded in the text or in the help text. One example of this is shown in FIG. 6. It can be seen that each step in a process not only contains text describing what to do to accomplish that step, but a visual image indicating where that step is to be performed. In this embodiment, in this embodiment, in which the invention is used to generate embedded images in text, the final text 245 is output with embedded images. This is indicated by the optional block 438 in FIG. 4.

However, the present invention need not be used to embed images in text. Instead, the present invention can simply be used to display the captured images to an author, where the author is generating a written description of the steps taken and for which images are captured. For instance, the author may be generating text describing a process by which a virus is to be repaired or removed from a computer. The author may not wish to include embedded images in that text. In that case, the images are simply displayed and optionally the automatically generated text is also displayed to the author, and the author can either generate text from scratch or modify the automatically generated text, in an embodiment in which it is provided.

In any case, final text 245 will illustratively be created in, or translated into, whatever schema the content will finally be published in. This can, for example, be Microsoft Assistance mark up language (MAML), HTML, or some other XML format.

It can thus be seen that the present invention can be used to assist in the authoring of content. A macro recording component 210 watches as a user performs steps on user interface 205 to perform an overall task. As the user performs those steps, the recorder records visual UI elements that the author has worked with. In one embodiment, those visual images include screenshots of both the control being manipulated (and possibly some additional context), and the parent window of that control. The series of images used to perform the overall task can then be used to allow an author to clearly understand what each recorded step refers to in order to allow the author to generate clear and concise text corresponding to each step. Alternatively, the recorded images can be exported from the authoring tool and incorporated into the textual content itself. The result is a content (such as help topic) that shows the end user, step-by-step, an image of what to do as they perform the step themselves, and text describing each step.

Although the present invention has been described with reference to particular embodiments, workers skilled in the art will recognize that changes may be made in form and detail without departing from the spirit and scope of the invention.

What is claimed is:

1. A method of generating content indicating the progressive steps to be taken on a user interface to perform a task, the method comprising:

receiving a user input indicative of user manipulation of a control on the user interface;

recording, in response to the user input, an image of the control manipulated by the user on the user interface;

recording separately a context image showing a context of the control with respect to the user interface;

recording separately an image of a parent window of the control on the user interface;

displaying the recorded image of the control, the context image, and the image of the parent window on an editor component configured to automatically receive and edit a pre-associated textual description of the user manipulation of the control for each image as a step in the performance of the task;

repeating the above steps for user manipulation of at least another control;

generating content describing the progressive steps to be taken to perform a task on the user interface, with the image of the control, the contextual image, and the image of the parent window separately embedded in the corresponding pre-associated textual description.

2. The method of claim 1 and further comprising:

prior to displaying the recorded image on an editor component, automatically generating text corresponding to user manipulation of the control.

3. The method of claim 2 and further comprising:

embedding the image in the textual description.

4. The method of claim 1 wherein recording an image comprises:

receiving position information indicative of a position of the control on the user interface.

5. The method of claim 4 wherein recording an image comprises:

receiving size information indicative of a size of the control on the user interface.

6. The method of claim 5 wherein recording comprises:

recording context image information indicative of the context image based on the size information and the position information.

7. The method of claim 6 wherein recording context information comprises:

calculating the context information to record based on a heuristic.

8. The method of claim 6 wherein recording context information comprises recording an image about at least a portion of a periphery of the image of the control.

9. The method of claim 6 wherein recording an image comprises:

receiving parent window information indicative of the parent window.

10. The method of claim 1 wherein displaying comprises:

displaying the image of the control and the context image and the image of the parent window on a first display portion of the editor component; and displaying selectable indicators of the steps taken to perform the task on a second display portion of the editor component.

11. The method of claim 10 wherein the editor component is configured such that when one of the selectable indicators is selected, images corresponding to the step associated with the selected indicator are displayed on the first display portion of the editor component.

12. A content generation system for generating content describing the progressive steps to be taken by a user to perform a task on a user interface, comprising:

a recording system configured to:

receive an indication that the user has taken a step by manipulating a control record an image of the control;

record separately a contextual image, larger than the image of the control, at least partially showing a context of the control with respect to the user interface;

record separately an image of a parent window on the user interface that is parent to the control; and an editor component configured to:

display the image of the control, the contextual image, and the image of the parent window;

automatically receive and edit pre-associated text with a description of steps in the performance of the task for each image;

repeat the above recording system steps and above editor component steps for user manipulation of at least another control;

generate the content describing the progressive steps to be taken to perform a task on the user interface, with the image of the control, the contextual image, and the image of the parent window separately embedded in the corresponding pre-associated text.

13. The content generation system of claim 12 wherein the recording system is configured to record step identifying information identifying the recorded step.

14. The content generation system of claim 13 and further comprising:

an automatic text generation system configured to receive the step identifying information and automatically generate text describing the step based on the identifying information.

15. The content generation system of claim 12 wherein the recording system comprises:

a component configured to identify a position on the user interface, and a size, of the control manipulated by the user.

16. The content generation system of claim 15 wherein the recording system is configured to record an image of the control based on the position and size of the control on the user interface.

17. The content generation system of claim 12 wherein the editor component is configured to display the contextual image and the image of the parent window on a first portion of a display screen.

18. The content generation system of claim 17 wherein the editor component is configured to display the text associated with the steps taken by the user on a second portion of the display screen, the text including a plurality of indicators, one for each step.

19. The text generation system of claim 18 wherein the editor component is configured to receive a user selection of one of the indicators in the second portion of the display screen and display the contextual image and the image of the parent window associated with the selected indicator on the first portion of the display screen.

20. A computer readable storage medium storing instructions which, when read by a computer, cause the computer to perform a method of generating content indicating the progressive steps to be taken on a user interface to perform a task, the method comprising:

detecting a user manipulation of an element on a user interface; and recording, in response to the user manipulation, an image from the user interface indicative of the element;

recording separately a context image showing at least a portion of a context of the element with respect to the user interface;

recording separately an image of a parent window of the element on the user interface;

displaying the recorded image of the element, the context image, and the image of the parent window on an editor component configured to automatically receive and edit a pre-associated textual description of the user manipulation of the element for each image indicating a step to be taken on a user interface to perform a task;

repeating the above steps for user manipulation of at least another element;

generating content describing the progressive steps to be taken to perform a task on the user interface, with the image of the control, the contextual image, and the image of the parent window separately embedded in the corresponding pre-associated textual description.

21. The computer readable storage medium of claim 20 wherein detecting comprises:

identifying a size and position of the element.

22. The computer readable storage medium of claim 21 wherein recording comprises:

recording an image of the element based on the size and position of the element.

23. The computer readable storage medium of claim 20 and further comprising:

automatically generating text associated with the recorded image.

24. The computer readable storage medium of claim 20 wherein the element comprises a control element.

25. The computer readable storage medium of claim 24 wherein the element comprises a text box.

* * * * *